US010096182B2

(12) United States Patent
Prasad et al.

(10) Patent No.: US 10,096,182 B2
(45) Date of Patent: Oct. 9, 2018

(54) USING A LIGHT UP FEATURE OF A MOBILE DEVICE TO TRIGGER DOOR ACCESS

(71) Applicant: Honeywell International Inc., Morris Plains, NJ (US)

(72) Inventors: Vinay Prasad, Bangalore (IN); Sanjay Roy, Plymouth, MN (US); Manu Taranath, Bangalore (IN); Mandar Tigga, Bangalore (IN); Haraprasad Senapati, Bangalore (IN); Murugan Gopalan, Bangalore (IN); Roshan Lawrence Valder, Bangalore (IN); Raghavendra Prasad Balapala, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/699,379

(22) Filed: Sep. 8, 2017

(65) Prior Publication Data
US 2018/0068507 A1 Mar. 8, 2018

Related U.S. Application Data

(60) Provisional application No. 62/385,031, filed on Sep. 8, 2016.

(51) Int. Cl.
*G07C 9/00* (2006.01)
*H04M 1/725* (2006.01)
(Continued)

(52) U.S. Cl.
CPC ........ *G07C 9/00119* (2013.01); *G06F 1/3228* (2013.01); *G06F 3/0488* (2013.01); *G07C 9/00103* (2013.01); *H04M 1/72527* (2013.01)

(58) Field of Classification Search
CPC ............ G07C 9/00119; G07C 9/00103; G06F 1/3228; G06F 3/0488; H04M 1/72527
See application file for complete search history.

(56) References Cited

U.S. PATENT DOCUMENTS 7,685,606 B2   3/2010   Chang
9,307,396 B2   4/2016   Jung et al.
(Continued)

FOREIGN PATENT DOCUMENTS

EP      2570908 A1   3/2013
WO   2015072693 A1   5/2015

OTHER PUBLICATIONS

International Search Report and Written Opinion from related PCT Application No. PCT/US2017/050765, dated Dec. 20, 2017, 11 pages.

*Primary Examiner* — Thomas Alunkal
(74) *Attorney, Agent, or Firm* — Brooks, Cameron & Huebsch, PLLC

(57) ABSTRACT

Devices, systems, and methods for using a light up feature of a mobile device to trigger door access are described herein. One mobile device for using the light up feature to trigger door access, includes a display, a processor, and memory, coupled to the processor, wherein the memory includes instructions executable by the processor to lock the mobile device when in sleep mode, turn the display off when the mobile device has been placed in the sleep mode and to turn the display on when the mobile device has been placed in light up mode but the device is not unlocked, transition a door access application from a low power state to a regular power state when the mobile device is placed in light up mode, and trigger the opening of a door based on a door access protocol once the application is in regular power state.

10 Claims, 3 Drawing Sheets

(51) Int. Cl.
    *G06F 1/32*     (2006.01)
    *G06F 3/0488*     (2013.01)

(56) References Cited

U.S. PATENT DOCUMENTS

| | | | |
|---|---|---|---|
| 2007/0277230 A1 | 11/2007 | Hawkins et al. | |
| 2010/0257906 A1* | 10/2010 | Sorensen | E05B 47/068 70/91 |
| 2011/0140868 A1* | 6/2011 | Hovang | G08B 25/008 340/12.55 |
| 2012/0221473 A1* | 8/2012 | Redmann | G06Q 30/06 705/50 |
| 2012/0272230 A1 | 10/2012 | Lee | |
| 2014/0055270 A1* | 2/2014 | Perry | A01M 23/16 340/573.2 |
| 2014/0199985 A1 | 7/2014 | Lovich et al. | |
| 2014/0274226 A1* | 9/2014 | Pandya | H04W 52/0261 455/574 |
| 2015/0268719 A1* | 9/2015 | Li | G06F 3/013 345/156 |
| 2016/0047142 A1 | 2/2016 | Gengler et al. | |
| 2016/0165542 A1* | 6/2016 | Mori | H04W 76/10 370/311 |
| 2016/0330413 A1* | 11/2016 | Scalisi | H04N 7/186 |

\* cited by examiner

USING A LIGHT UP FEATURE OF A MOBILE DEVICE TO TRIGGER DOOR ACCESS

PRIORITY INFORMATION

This application is a Non-Provisional of U.S. Provisional Application No. 62/385,031, filed Sep. 8, 2016, the contents of which are incorporated herein by reference.

TECHNICAL FIELD

The present disclosure relates to systems, devices, and methods for using a light up feature of a mobile device to trigger door access.

BACKGROUND

Door access control systems are designed to provide access to areas of a building for individuals who are authorized to access such areas and deny access to those areas of the building to individuals who are not authorized to access such areas. For example, certain individuals may be authorized to access a secure area of a building, whereas other individuals may not be allowed to access the secure area.

In some embodiments, executable instructions (i.e., software) on a mobile device can be used to communicate with one or more devices in a door access system to allow a user of the mobile device access to an authorized area.

However, in many instances, the user must stop before entry, unlock their mobile device, and access an application on the device to initiate the communication between the mobile device and the door access system. This can be time consuming and annoying to the user.

In other implementations, the application may be always on in the background of the mobile device whether the mobile device is unlocked or not. But, such arrangements waste a considerable amount of energy as the application on the mobile device can, for example, very often be searching for a door access device to communicate with. This may cause the battery of the mobile device to become depleted, can cause the mobile device to heat up, and/or can cause unwanted access to doors as the user passes by a door with their mobile device, among other issues that may arise.

DETAILED DESCRIPTION

Figure 1:
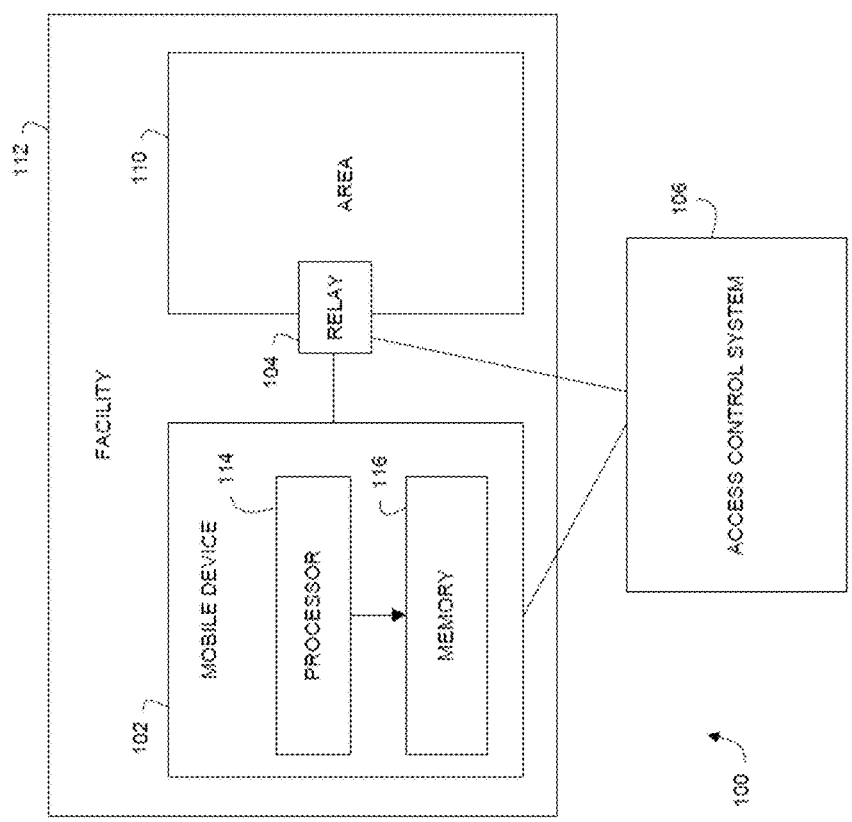
FIG. 1 illustrates a system for using a light up feature of a mobile device to trigger door access in accordance with one or more embodiments of the present disclosure.

Devices, systems, and methods for using a light up feature of a mobile device to trigger door access are described herein. One mobile device embodiment for using the light up feature to trigger door access, includes a display, a processor, and memory, coupled to the processor, wherein the memory includes instructions executable by the processor to lock the mobile device when in sleep mode, turn the display off when the mobile device has been placed in the sleep mode and to turn the display on when the mobile device has been placed in light up mode but the device is not unlocked, transition a door access application from a low power state to a regular power state when the mobile device is placed in light up mode, and trigger the opening of a door based on a door access protocol once the application is in regular power state.

Generally speaking, increased security can be provided through capabilities offered by mobile devices. In some embodiments, biometric validation (e.g., fingerprint scanning) can be carried out via the mobile device. In some embodiments, users (i.e., the user's mobile device) can be assigned a digital identifier (discussed further below). The digital identifier can allow the mobile device, instead of a physical hardware access controller, to control access, for instance.

User interaction with the door access control system can be streamlined via capabilities offered by mobile devices. For example, in some embodiments, global positioning system (GPS), WiFi, and/or other location functionalities provided by the mobile device may allow the automatic determination of user location (e.g., without user input). Thus, rather than physically presenting a card (or other device) for access to an area, the user can simply move with their mobile device within a particular distance of the area.

That is, whereas previous approaches may utilize "card readers," which typically call for a user to present a card (e.g., badge and/or other token), read the card, then transmit a signal physically to an access controller to make an access determination (e.g., whether the user is allowed access), embodiments of the present disclosure can allow the mobile device itself to effectively become the card. Then, the "card" can be presented to a "reader" by virtue of the mobile device being in a particular physical location (or within a particular distance of a particular physical location) and meeting other layers of security as discussed herein.

As described below, the embodiments of the present disclosure can provide a door access process that consumes less mobile device power and that may be more convenient for the user of the mobile device to use, among other benefits.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. As used herein, "a" or "a number of" something can refer to one or more such things. For example, "a number of areas" can refer to one or more areas.

FIG. 1 illustrates a system 100 for access control via a mobile device in accordance with one or more embodiments of the present disclosure. As shown in FIG. 1, system 100 includes a mobile device 102, a relay 104, and a door access control system (ACS) 106.

One or more portions of the system 100 can be implemented in a facility 112, for instance. A facility, as used herein, can refer to one or more buildings, businesses, homes, plants, hospitals, refineries, etc. Facilities can include indoor and/or outdoor areas.

Though in the example illustrated in FIG. 1 the ACS 106 is shown external to the facility 112 (e.g., remote with respect to the facility 112), embodiments of the present disclosure are not so limited. In some embodiments, the ACS 106 is internal to the facility 112 (e.g., local with respect to the facility 112).

The mobile device 102 can be a client device carried or worn by a user. For example, the mobile device 102 can be a phone (e.g., smartphone), personal digital assistant (PDA), tablet, and/or wearable device (e.g., wristband, watch, necklace, etc.).

The mobile device 102 can include one or more software applications (e.g., apps) which can define and/or control communications between the mobile device 102, the ACS 106, and/or other devices. Apps may be received by the mobile device 102 from the ACS 106, for instance.

Apps may be launched by a user and/or responsive to some other condition (e.g., the interaction between the mobile device 102 and a device within the door access system, such as a controller or relay). In some embodiments, apps can be executing as background apps wherein a user may access other apps and view information about those apps on the display of the mobile device while the app in the background continues to function, but the information is not provided on the display for the user to view.

In this manner, a user may have multiple apps functioning at the same time with one app's information being visible on the display of the mobile device while the other apps are functioning in the background. Although having multiple apps functioning on the device may provide benefits, their functioning also uses energy and may reduce the amount of energy stored in a battery of the device or slow the computing speed of the device as it can be processing many jobs related to these functions at the same time.

The relay 104 can be a device allowing remote control that can be actuated by variation in conditions of one or more electric circuits. In some examples, the relay 104 can be a locking device (e.g., for a door). In some examples, the relay 104 can include one or more actuating mechanisms. The relay 104 can be associated with one or more controlled functionalities. As used herein "controlled functionality" refers to a functionality under the control of the ACS 106. For instance, an electronic door lock may be controlled by the ACS 106.

In some embodiments, the control may be provided from the mobile device 102, as described in the embodiments herein. In some embodiments, the control may be provided directly (from the ACS 106 to the relay 104) or via one or more intermediary devices (e.g., a controller) in communication with the relay 104.

Because, as described above, the "card" can be presented to a "reader" by virtue of the mobile device 102 being in a particular physical location (or within a particular distance of a particular physical location), embodiments of the present disclosure can implement the relay 104 in the absence of a controller (e.g., a local controller). That is, in some embodiments, the relay 104 does not include a controller. Various examples herein may refer to the relay 104 being a locking device for a door, but it is to be understood that such examples are not to be taken in a limiting sense; embodiments of the present disclosure do not limit relay 104 to a particular device.

The relay 104 can be associated with an area 110 of the facility 112. As referred to herein, an area can be a portion of a facility. In some embodiments, the area 110 can be a room, a plurality of rooms, a wing, a building, a plurality of buildings, an installation, etc. In some embodiments, the area 110 can be defined by physical boundaries (e.g., walls, doors, etc.). In some embodiments, the area 110 can be defined by logical and/or geographic boundaries. The area 110 can be defined by a user, by a Building Information Model (BIM) associated with the facility 112, and/or by the ACS 106.

The ACS 106 can control (e.g., manage) access to a number of areas (e.g., the area 110) of the facility 112. As previously discussed, the ACS 106 can be remote with respect to the facility 112 and/or local with respect to the facility 112. In some embodiments, the ACS 106 can be cloud-based. In some embodiments, the ACS 106 can manage access to one or more areas across a plurality of facilities.

The mobile device 102 can communicate with (e.g., exchange data with) the ACS 106 via a wired and/or wireless connection, for instance. In some embodiments, the mobile device 102 can communicate using one or more communication modules (e.g., cellular, WiFi, etc.). The ACS 106 can communicate with the relay 104 via a wired and/or wireless connection, for instance.

Communication between various devices herein can be carried out over a wireless network. A wireless network, as used herein, can include WiFi, Bluetooth, or any other suitable means to wirelessly transmit and/or receive information.

As discussed above, mobile device 102 can include a memory 116 and a processor 114 configured to execute executable instructions stored in the memory 116 to perform various examples of the present disclosure, for example. For instance, a mobile device for providing door access control can include a processor and memory that is coupled to the processor.

The memory includes instructions executable by the processor to provide a variety of functions and data also stored in the memory to be used in executing the instructions. For example, in some embodiments, the memory includes instructions executable by the processor to provide data in the form of a specific user identifier, assigned to the mobile device to the door access controller which allows the door access controller to confirm that the user is authorized to access the area to be accessed.

Provided below is an example of a mobile device for triggering door access. One such mobile device can include a display, a processor, and memory, coupled to the processor, wherein the memory includes instructions executable by the processor.

The executable instructions can, for example, be executed to lock the mobile device when in sleep mode, turn the display off when the mobile device has been placed in the sleep mode and to turn the display on when the mobile device has been placed in light up mode but the device is not unlocked. The instructions can then transition a door access application from a low power state to a regular power state when the mobile device is placed in light up mode (while the mobile device is still not unlocked) and trigger the opening of a door based on a door access protocol once the application is in regular power state.

In some embodiments, the instructions executable by the processor further include instructions to detect a battery storage level. Such embodiments can be beneficial, for example, because they can also include instructions to switch the mobile device from an operational mode (wherein the user can view and interact with apps on the display of the mobile device) to the light up mode (where the user cannot interact with the apps on the display of the mobile device) when the detected battery storage is below a threshold amount. The threshold amount can be any suitable amount.

In some embodiments, the instructions executable by the processor further include instructions to transition a door access application from a regular power state to a low power state when the mobile device is placed in sleep mode. In such embodiments, the regular power state is in which the application is fully operational and, for example, is trying to identify devices in the door access system to communicate with. When the application is in low power state, the application is still running on the device, but its functionality can be limited to, for example, only be waiting to receive a communication from the mobile device that the light up mode has been initiated at which point the application switches to regular power state and attempts to communicate with one or more devices in the door access system.

Such embodiments can be beneficial, for example, because they don't require the user to unlock their mobile device, but rather just initiate the light up mode which does not unlock the mobile device. Such embodiments also conserve power because the app is not functioning in the background in regular power state and since the mobile device does not need to be unlocked, it consumes less power. Additionally, in some such embodiments, the app is not trying to identify devices in the door access system to communicate with and therefore it uses less power and will not trigger doors to be unlocked (allowing access to the user) unintentionally, which could lead to unintended security breaches by allow non-authorized parties to access areas while the door is unintentionally unlocked.

Provided below is an example of a system embodiment of the present disclosure. In this embodiment, the system for providing door access control via a mobile device includes a mobile device and a door access control system.

The mobile device has a processor and memory, coupled to the processor, wherein the memory includes instructions executable by the processor. Similar to the instructions discussed above, the instructions of this system include instructions to lock the mobile device when in sleep mode, turn the display off when the mobile device has been placed in the sleep mode and to turn the display on when the mobile device has been placed in light up mode but the device is not unlocked, transition a door access application from a low power state to a regular power state when the mobile device is placed in light up mode, and trigger the opening of a door based on a door access protocol once the application is in regular power state.

The one or more devices of the door access control system also include executable instructions to provide a variety of functions. For example, in some embodiments the instructions are executable to determine an area of a facility to which a user is authorized access, receive a trigger communication to trigger the opening of a door to the area, and authorize access to the authorized area by a user of the mobile device and trigger the unlocking of the door.

In some embodiments, the trigger communication can be an instruction to unlock the door, for example, or can include authentication information that can be checked against information in the door access system to confirm that the user of the mobile device is authorized to access the area to be accessed.

Such authentication information can be data stored in memory on the mobile device, for example, and can be information such as, but not limited to: user's name, password, passcode, one time password, signature, pattern, fingerprint, face recognition, voice information, iris information, and/or knock recognition. This confirmation can be accomplished, for example, by checking the data sent from the mobile device against data stored in the memory of the ACS or elsewhere, for example, to confirm the information is valid and/or allows the access by the user (e.g., the data from the mobile device matches that stored in memory of the ACS).

The door access control system includes executable instructions to determine an area of a facility to which a user is authorized access. This can, for example, be accomplished by checking data stored in the memory of the ACS or elsewhere, such as on a device connected to the ACS via a network.

The memory 116 can be any type of non-transitory storage medium that can be accessed by the processor 114 to perform various examples of the present disclosure. For example, the memory 116 can be a non-transitory computer readable medium having computer readable instructions (e.g., computer program instructions) stored thereon that are executable by the processor 114.

The memory 116 can be volatile or nonvolatile memory. The memory 116 can also be removable (e.g., portable) memory, or non-removable (e.g., internal) memory. For example, the memory 116 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 116 is illustrated as being located within the mobile device 102, embodiments of the present disclosure are not so limited. For example, memory 116 can also be located internal to another computing resource (e.g., enabling computer readable instructions to be downloaded over the Internet or another wired or wireless connection). In some embodiments, the memory 116 and/or the processor 114 can be located in the ACS 106.

In addition to, or in place of, the execution of executable instructions, various examples of the present disclosure can be performed via one or more devices (e.g., one or more controllers) having logic.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

As discussed herein, the determination of whether the user of the mobile device is allowed access to the area can be made by the mobile device. Accordingly, access control (i.e., the determination of whether to grant access) can be moved from a controller (or other hardware device(s) seen in previous approaches) to the mobile device itself.

Accordingly, where access control is implemented on a mobile device in accordance with embodiments of the present disclosure, facilities need not employ complex physical access controllers capable of managing access only to a limited number of access points (e.g., doors) as in previous approaches. Instead, a remote and/or virtual (e.g., cloud-based) controller can be implemented, for instance, in conjunction with one or more relays (such as those previously discussed).

Figure 2:
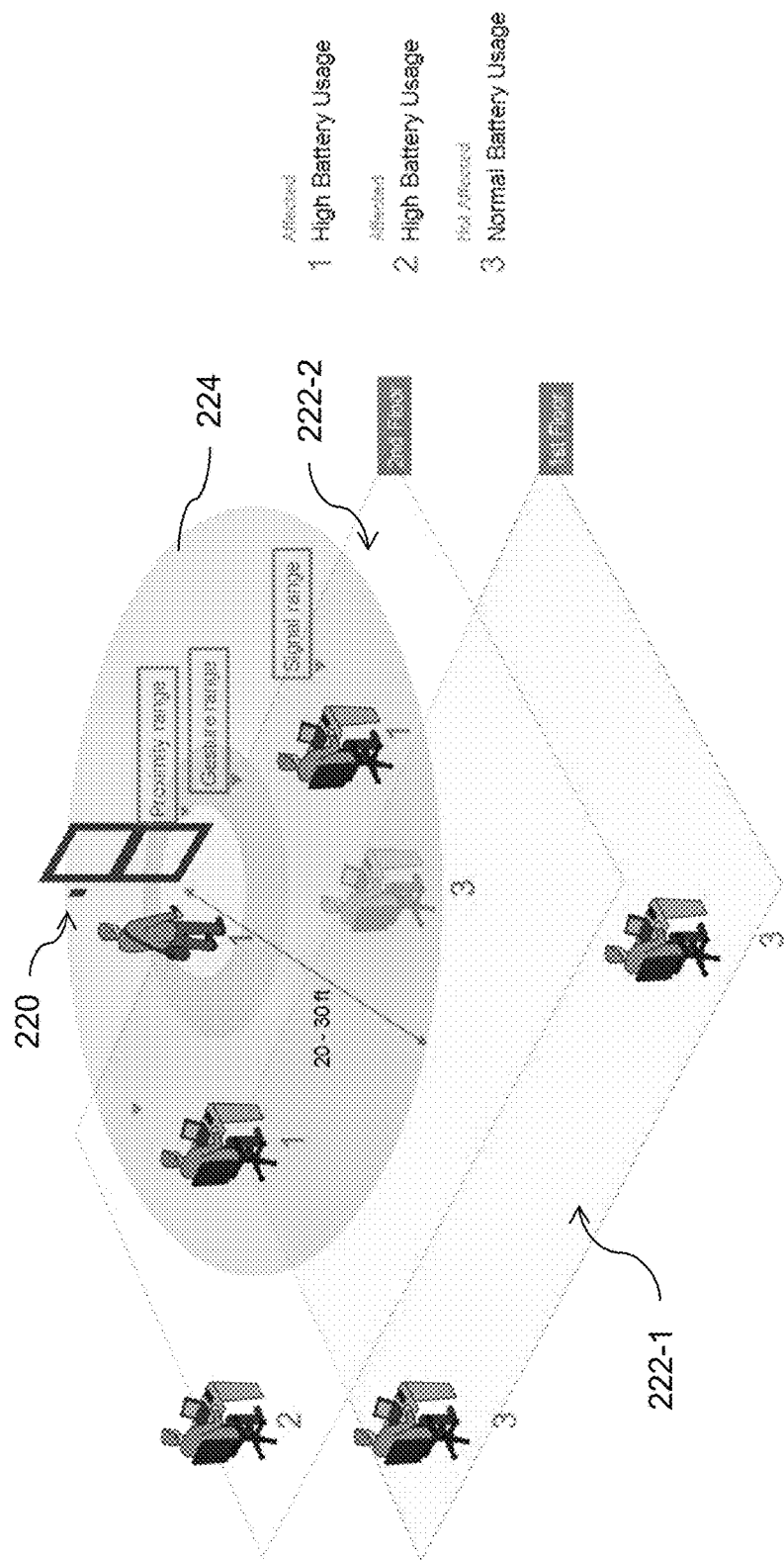
FIG. 2 illustrates a situation in which embodiments of the present disclosure could be utilized.

FIG. 2 illustrates a situation in which embodiments of the present disclosure could be utilized. In the situation of FIG. 2, a number of people (who have mobile devices) are seated or standing around a door that allows access to a restricted area. The door includes a door access system device 220 that will actuate to unlock the door once the user has been vetted by the system and is deemed to be allowed to access the restricted area.

The signal strength range of the device 220 is illustrated by the circle 224. In such an embodiment, the people on the same floor as the door 222-2 can be located within the range of the device or outside the range of the device, while those on neighboring floors 222-1, may not be within range even though they may be closer in distance to the device than some people on floor 222-2.

In prior implementations, if the person (their mobile device) was within the signal range, the mobile device would attempt to communicate with the system device 220, thereby draining power from the mobile device (as indicated by the people labeled with the number 1). If the user was near the outer range of the signal, it may still be affected by occasional signals from the system device (as indicated by the person labeled with the number 2). If the mobile device was well outside the range of the system device 220, then there would be no adverse change to the power of the mobile device (as indicated by the people labeled with the number 3).

The embodiments of the present disclosure avoid this battery draining issue because the door access app on the mobile device is not looking to communicate with a system device, such as device 220 while the mobile device is in sleep mode (the app is in low power mode), but rather, is looking for an indication that the mobile device is initiating light up mode and once light up mode is initiated, the app enters regular power mode and begins attempting to communicate with the system device 220. Such embodiments would be particularly beneficial for the people labeled with numbers 1 and 2 in FIG. 2).

Figure 3:
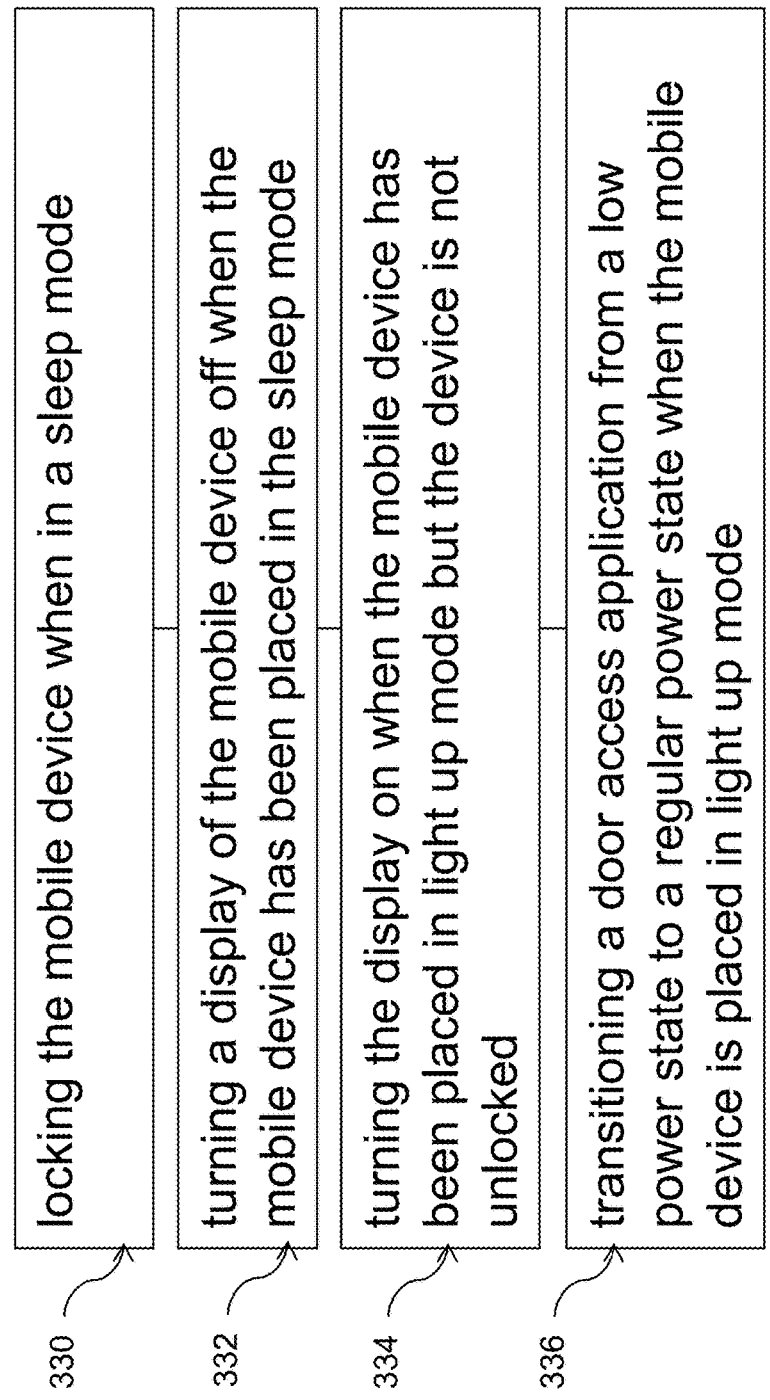
FIG. 3 illustrates a method for using a light up feature of a mobile device to trigger door access in accordance with one or more embodiments of the present disclosure.

FIG. 3 illustrates a method for access control via a mobile device in accordance with one or more embodiments of the present disclosure. In some embodiments, method of FIG. 3 can be performed by the mobile device 102 (previously discussed in connection with FIG. 1). In some embodiments, the method of FIG. 3 can be performed by ACS 106 (previously discussed in connection with FIG. 1), though embodiments of the present disclosure are not so limited.

At block 330, the method includes locking the mobile device when in a sleep mode. This can be accomplished actively by the user, wherein the user intentionally locks their mobile device. In some embodiments, the mobile device can have a timeout function where after a certain period of time where the user has not interacted with the mobile device, the mobile device switches from operational mode to sleep mode and the mobile device is locked. In order to access and use the applications on the mobile device, the user will then have to intentionally unlock the device and upon doing that process, the apps become available for interaction by a user. However, many devices have a light up mode wherein the display of the mobile device is illuminated (sometimes the display includes some limited information from the apps or operating system software that is functioning on the device), but the device is not unlocked and if the device is not unlocked, the device returns to sleep mode.

At block 332, the method includes the action of turning a display of the mobile device off when the mobile device has been placed in the sleep mode. Further, at block 334, the method includes turning the display on when the mobile device has been placed in light up mode but the device is not unlocked. These method elements are discussed in more detail above.

At block 336, the method includes transitioning a door access application (on the mobile device) from a low power state to a regular power state when the mobile device is placed in light up mode. This action allows the mobile device to identify devices of the door access system that the mobile device can communicate with (i.e., those within the signal range of the mobile device). In some embodiments, if there are multiple devices within the signal range, the mobile device may include executable instructions to determine the device that is desired by the user (i.e., door access device, such as a controller, that controls access to the door to which the user wants to gain access.

Once the correct door is identified, the correct device of the door access system triggers the opening of a door based on a door access protocol once the application is in regular power state. As discussed herein in some embodiments, the system further includes executable instructions confirming that at least one other criterion (i.e., user identifier, proximity to the door access device, etc.) for triggering the opening of the door has been met based on data stored in memory of the mobile device.

In some embodiments, in order to reduce the number of unintentional unlocking of doors, the system can include instructions to check to see if the mobile device has been granted access within a specific period. In this manner, if the mobile device is repeatedly asking for the door to be unlocked, the door access system can choose to ignore those requests until a period of time has past. This can be accomplished, for example, by confirming that a trigger communication has not been sent to the door access controller (e.g., from the mobile device) during a particular time period.

In some embodiments, the determination of whether the user of the mobile device is allowed access to the area can be made by the mobile device. In some embodiments, the determination of whether the user is allowed access to the area can be made by a (local and/or remote) door access control system.

In accordance with one or more embodiments of the present disclosure, mobile devices can receive an input (or a plurality of inputs) from a user requesting access. In some embodiments, access or access denial may depend on the performance of one or more particular inputs. The performance of such inputs may take place at a particular time and/or at a particular location.

As such, in some embodiments, methods can further include confirming that the user has completed a required gesture with the mobile device. For example, in some such embodiments, confirming that the user has completed a required gesture includes confirming that the mobile device was moved within a predetermined distance to an object associated with the area. Methods can, for instance include confirming that the user has completed a required gesture such as confirming that the mobile device was manipulated in particular manner.

A gesture, as referred to herein, includes a particular movement, positioning, orientation, and/or manipulation of the mobile device. For example, in some embodiments, the gesture can include a knock by the user on the mobile device. In some embodiments, the gesture can include a plurality of knocks by the user on the mobile device. A "knock" can refer to a striking, by an object, of the mobile device. A knock on the mobile device can resemble a knock on a door, for instance.

In some embodiments, the gesture can include a manipulation of an orientation of the mobile device. For example, the mobile device can be shaken, rotated, and/or twisted, among other manipulations. In some embodiments, the gesture can include a presentation of the mobile device to an object associated with the area. That is, the mobile device can be presented (e.g., drawn near) a door, door reader, turnstile, door frame, etc. The mobile device can be knocked against a card reader, for instance.

In some embodiments, the gesture can include a particular manipulation of the mobile device, wherein the particular manipulation does not include the mobile device impacting an object. For example, the mobile device can be used to "knock" without making contact with another object (other than the user).

In some embodiments, the mobile device can be configured to prompt the user to make the gesture. For example, upon determining that the mobile device is within the particular distance of the area of the facility, embodiments of the present disclosure can prompt the user to make the gesture. The prompt can be a particular sound played by the mobile device and/or a particular vibration, among other prompts. In some embodiments, performance of the gesture before the prompt to make the gesture may be ineffective at obtaining access.

If the user is determined to be allowed access to the area, and if a proper input was made by the user into the mobile device (e.g., an acceptable gesture was made), the mobile device and/or the door access control system can transmit a signal (e.g., a control signal) to a relay associated with the area to allow access. In an example, the relay can be responsible for physically locking a door to the area and the signal causes the relay to change from a locked mode to an unlocked mode. Thus, the relay can grant the user access to the area of the facility responsive to a determination by the mobile device and/or the door access control system that the user is allowed access.

Although not illustrated in FIG. 2, method can include providing a number of notifications via the mobile device. A notification can be provided, for instance, responsive to access being granted to the user. In some embodiments, the mobile device can emit a particular audio notification (e.g., a beep) when access is granted. In some embodiments, the mobile device can vibrate when access is granted.

A notification can be provided, for instance, responsive to access being denied to the user. In some embodiments, the mobile device can emit a particular audio notification (e.g., a buzzer) when access is denied. In some embodiments, the mobile device can vibrate when access is denied. In some embodiments, the notification can include an audio and/or textual message including an explanation and/or reason for the denial of access.

The notification of the denial can include an option to contact a security operator (e.g., guard) and/or maintenance personnel. Thus, if equipment failure is responsible for the denial it can be addressed in a timely manner. In some embodiments, a notification can be sent to a security operator responsive to a repeated denial and/or a denial to a particular (e.g., highly-secure) area without the user's knowledge.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A mobile device for triggering door access, comprising:
a display; and
a processor and memory, coupled to the processor, wherein the memory includes instructions executable by the processor to:
lock the mobile device when in sleep mode;
turn the display off when the mobile device has been placed in the sleep mode and to turn the display on when the mobile device has been placed in light up mode that is initiated by a user action or by the mobile device upon the mobile device determining it is within a particular distance from a door to an area of a facility, wherein the device is not unlocked;
transition a door access application from a low power state to a regular power state when the mobile device is placed in light up mode; and
trigger the opening of the door based on a door access protocol once the application is in regular power state.

2. The mobile device of claim 1, wherein the instructions executable by the processor further include instructions to detect a battery storage level.

3. The mobile device of claim 2, wherein the instructions executable by the processor further include instructions to switch the mobile device from an operational mode to the light up mode when the detected battery storage is below a threshold amount.

4. The mobile device of claim 1, wherein the instructions executable by the processor further include instructions to transition a door access application from a regular power state to a low power state when the mobile device is placed in sleep mode.

5. A system for providing door access control via a mobile device, comprising:

a mobile device having a processor and memory, coupled to the processor, wherein the memory includes instructions executable by the processor to:
  lock the mobile device when in sleep mode;
  turn the display off when the mobile device has been placed in the sleep mode and to turn the display on when the mobile device has been placed in light up mode that is initiated by a user action or by the mobile device upon the mobile device determining it is within a particular distance of a door to an area of a facility, wherein the device is not unlocked;
  transition a door access application from a low power state to a regular power state when the mobile device is placed in light up mode that is initiated by a user action or by the mobile device upon the mobile device determining it is within a particular distance of a door to an area of a facility; and
  trigger the opening of the door based on a door access protocol once the application is in regular power state; and
a door access control system having at least one system device configured to:
  determine an area of a facility to which a user is authorized access; and
  receive a trigger communication to trigger the opening of a door to the area; and
  authorize access to the authorized area by a user of the mobile device and trigger the unlocking of the door.

6. A method for providing access control via a mobile device, comprising:
  locking the mobile device when in a sleep mode;
  turning a display of the mobile device off when the mobile device has been placed in the sleep mode and turning the display on when the mobile device has been placed in light up mode that is initiated by a user action or by the mobile device upon the mobile device determining it is within a particular distance of a door to an area of a facility, wherein the device is not unlocked; and
  transitioning a door access application from a low power state to a regular power state when the mobile device is placed in light up mode that is initiated by a user action or by the mobile device upon the mobile device determining it is within a particular distance of a door to an area of a facility.

7. The method of claim 6, wherein the method further includes triggering the opening of the door based on a door access protocol once the application is in regular power state.

8. The method of claim 6, wherein the method further includes confirming that the mobile device is within range to communicate with a door access controller.

9. The method of claim 6, wherein the method further includes confirming that at least one other criterion for triggering the opening of the door has been met based on data stored in memory of the mobile device.

10. The method of claim 8, wherein the method further includes confirming that a trigger communication has not been sent to the door access controller during a particular time period.

* * * * *